United States Patent
Venkatraman et al.

(10) Patent No.: US 9,167,390 B2
(45) Date of Patent: Oct. 20, 2015

(54) ADAPTIVE ASSISTANCE DATA FOR TIERED SERVICE AND EFFICIENCY IN INDOOR POSITIONING

(71) Applicant: QUALCOMM Incorporated, San Diego, CA (US)

(72) Inventors: Sai Pradeep Venkatraman, Santa Clara, CA (US); Ju-Yong Do, Palo Alto, CA (US); Weihua Gao, San Jose, CA (US); Amir A. Emadzadeh, Campbell, CA (US); Sundar Raman, Freemont, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 13/787,595

(22) Filed: Mar. 6, 2013

(65) Prior Publication Data
US 2014/0256346 A1   Sep. 11, 2014

(51) Int. Cl.
*H04W 24/00* (2009.01)
*H04W 4/04* (2009.01)
*G01S 5/02* (2010.01)

(52) U.S. Cl.
CPC ............. *H04W 4/043* (2013.01); *G01S 5/0236* (2013.01); *G01S 5/0252* (2013.01)

(58) Field of Classification Search
CPC ..... H04W 64/00; H04W 84/12; H04W 16/20; H04W 88/08; H04W 40/00
USPC ....................................................... 455/456.1
See application file for complete search history.

(56) References Cited

U.S. PATENT DOCUMENTS

| | | | |
|---|---|---|---|
| 2009/0061898 A1 | 3/2009 | Johnson et al. | |
| 2011/0032859 A1 | 2/2011 | Wirola et al. | |
| 2011/0090123 A1 | 4/2011 | Sridhara et al. | |
| 2012/0020296 A1 | 1/2012 | Scherzer et al. | |
| 2012/0329479 A1 | 12/2012 | Wirola et al. | |
| 2013/0035109 A1* | 2/2013 | Tsruya et al. | 455/456.1 |
| 2013/0162481 A1* | 6/2013 | Parvizi et al. | 342/452 |
| 2013/0281111 A1* | 10/2013 | Syrjarinne et al. | 455/456.1 |

FOREIGN PATENT DOCUMENTS

WO   0050919 A2   8/2000
WO   2006117587 A1   11/2006

OTHER PUBLICATIONS

International Search Report and Written Opinion—PCT/US2014/019804—ISA/EPO—May 27, 2014, 10 pages.
Written Opinion of the International Preliminary Examining Authority (IPEA)—PCT/US2014/019804—ISA/EPO—Feb. 2, 2015, 5 pgs.
International Preliminary Report on Patentability—PCT/US2014/019804, European Patent Office—Munich, Germany, Jun. 15, 2015, 19 pgs.

* cited by examiner

*Primary Examiner* — Kwasi Karikari
(74) *Attorney, Agent, or Firm* — Hunter Clark PLLC

(57) ABSTRACT

A method for providing tiered indoor positioning service includes: receiving a request for assistance data from a mobile device; receiving expected quality of service information from the mobile device; generating an adaptive assistance data file comprising heat map data based at least in part on the received expected quality of service information; and transmitting the adaptive assistance data file to the mobile device.

36 Claims, 4 Drawing Sheets

ADAPTIVE ASSISTANCE DATA FOR TIERED SERVICE AND EFFICIENCY IN INDOOR POSITIONING

BACKGROUND

Certain mobile devices, such as, for example, location-aware mobile devices, cellular telephones, smart telephones, tablets, or the like may assist users in estimating their geographic location by providing suitable or desired navigation or positioning information obtained or gathered from various systems. One such system may include, for example, a satellite positioning system (SPS), such as the Global Positioning System (GPS) or other like Global Navigation Satellite Systems (GNSS) comprising a number of Earth-orbiting satellites or space vehicles (SVs) capable of transmitting wireless signals to and receiving such signals from one or more suitable wireless transmitters or receivers, terrestrial or otherwise.

In an indoor environment, mobile devices may be unable to reliably receive or acquire requisite wireless signals to facilitate or support one or more position estimation techniques, for example, so as to enable location or navigation services. For example, in certain venues, signals from SVs or other wireless transmitters may be attenuated or otherwise affected in some manner (e.g., insufficient, weak, fragmentary, etc.), which may preclude their use in a given position estimation technique.

Accordingly, in an indoor or like environment, different techniques may be employed, for example, to enable navigation or location services. For example, a position of a mobile communication device may be estimated using an Institute of Electrical and Electronics Engineers (IEEE) wireless local access network (WLAN) standard 802.11 heat map signature matching technique, for example, in which characteristics of 802.11 WLAN wireless signals or signal signatures received at a mobile device are compared with expected signatures of such characteristics stored as heat map values in a database, wherein the individual signal signatures stored in the database are associated with particular locations. The heat map may comprise a grid of points, which may be associated with a local or global coordinate system and may be laid over or mapped to a floor plan of a venue at substantially uniform spacing. Observed characteristics of received 802.11 WLAN wireless signals may be expressed, for example, by one or more real values in relation to every detectable 802.11 WLAN access point, such as received signal strength indicator (RSSI), or round-trip time (RTT), etc. By finding a signature in a database that most closely matches characteristics exhibited by 802.11 WLAN wireless signals received at a mobile device, a location associated with a matching signature may be used as an estimated location of a mobile device. It should be appreciated that other positioning techniques including sequential filtering methods such as Particle filters, extended Kalman filters, and unscented Kalman filters, etc., are also sometimes utilized.

In one implementation, a mobile device downloads the database, or part thereof, in the form of assistance data (AD) from a server, and performs heat map signature matching locally to obtain an estimated location.

SUMMARY

Disclosed are methods, apparatuses, and systems, e.g., to provide tiered indoor positioning service. An example method may include: receiving a request for assistance data from a mobile device; receiving expected quality of service information from the mobile device; generating an adaptive assistance data file comprising heat map data based at least in part on the received expected quality of service information; and transmitting the adaptive assistance data file to the mobile device.

An embodiment includes a method for providing tiered indoor positioning service, comprising: receiving a request for assistance data from a mobile device; receiving expected quality of service information from the mobile device; generating an adaptive assistance data file comprising heat map data based at least in part on the received expected quality of service information; and transmitting the adaptive assistance data file to the mobile device.

Another embodiment includes a server apparatus for providing tiered indoor positioning service, comprising: a communication interface configured to: receive a request for assistance data from a mobile device; receive expected quality of service information from the mobile device; and transmit an adaptive assistance data file to the mobile device; a memory; and a processor, coupled to the memory, configured to: generate the adaptive assistance data file comprising heat map data based at least in part on the received expected quality of service information.

Another embodiment includes a computer-readable medium including code that, when executed by a processor, causes the processor to: receive a request for assistance data from a mobile device; receive expected quality of service information from the mobile device; generate an adaptive assistance data file comprising heat map data based at least in part on the received expected quality of service information; and transmit the adaptive assistance data file to the mobile device.

Another embodiment includes an apparatus for providing tiered indoor positioning service, comprising: means for receiving a request for assistance data from a mobile device; means for receiving expected quality of service information from the mobile device; means for generating an adaptive assistance data file comprising heat map data based at least in part on the received expected quality of service information; and means for transmitting the adaptive assistance data file to the mobile device.

DETAILED DESCRIPTION

In the following detailed description, numerous specific details are set forth to provide a thorough understanding of the claimed subject matter. The claimed subject matter, however, may be practiced without these specific details. In some instances, methods, apparatuses, or systems that would be known by one of ordinary skill have not been described in detail so as not to obscure claimed subject matter.

Some example methods, apparatuses, or articles of manufacture are disclosed herein that may be used to facilitate or support one or more processes or operations in connection with providing tiered positioning service with adaptive assistance data in an indoor venue. As used herein, "indoor venue" may refer to various partially or substantially enclosed areas associated with an indoor environment (e.g., a building, general area(s) within a building, etc.) By way of example but not limitation, indoor venues may comprise, for example, an office building, a convention center, an auditorium, an office building, a warehouse, a classroom building, a theater, a supermarket, a shopping mall, a sports arena, a stadium, a transit station terminal, a library, etc., just to name a few examples.

As was indicated, example methods, apparatuses, or articles of manufacture presented herein may be implemented, in whole or in part, for use in or with mobile communication devices featuring, for example, a location or navigation capability. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, or the like. It should be appreciated, however, that these are merely illustrative examples relating to mobile devices that may be utilized to facilitate or support one or more processes or operations in connection with providing tiered positioning service with adaptive assistance data in an indoor venue.

Techniques are discussed regarding indoor navigation and/or location systems for mobile communication devices. For example, devices for providing tiered indoor positioning service with adaptive assistance data are discussed.

Figure 1:
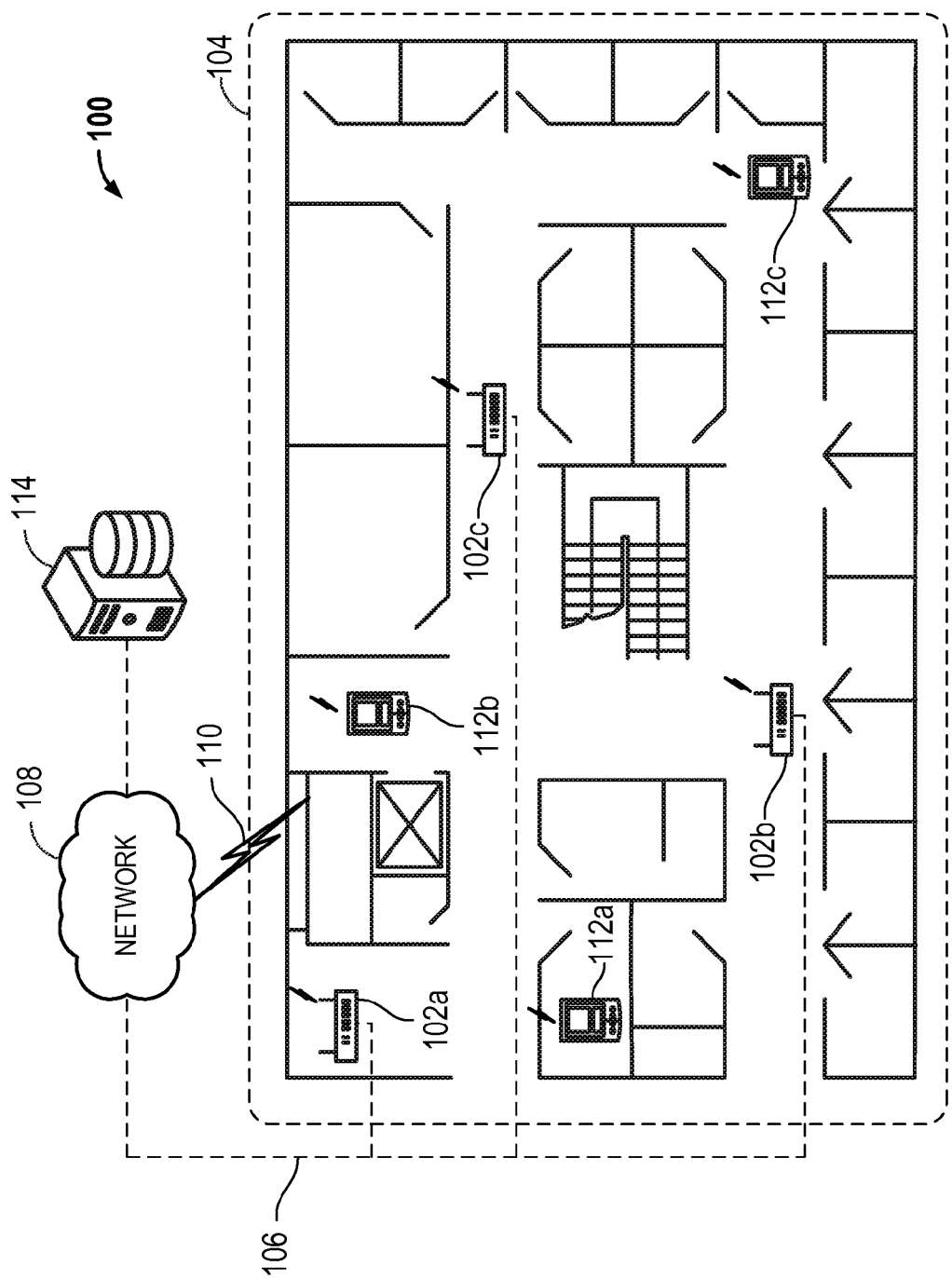
FIG. 1 is a schematic diagram illustrating certain features associated with an example operating environment according to an implementation.

FIG. 1 is a schematic diagram illustrating certain features, functions, etc., associated with an example operating environment 100 that may be communicatively enabled to facilitate or support one or more processes or operations in connection with providing tiered positioning service with adaptive assistance data in an indoor venue. It should be appreciated that operating environment 100 is described herein as a non-limiting example, and that one or more processes or operations associated with providing tiered positioning service with adaptive assistance data in an indoor venue may be implemented, in whole or in part, in the context of various communications networks or combination of networks. Such networks may include, for example, public networks (e.g., the Internet, the World Wide Web), private networks (e.g., intranets), wireless local area networks (WLAN), or the like.

As illustrated, operating environment 100 may comprise one or more WLAN access points 102a, 102b, and 102c, for example, operatively arranged within an example venue or like area of interest 104. Even though only a certain number of access points are illustrated, any number of access points may be implemented to facilitate or otherwise support one or more techniques or processes associated with operating environment 100. Also, it should be appreciated that the configuration shown is merely an example configuration to which claimed subject matter is not limited. As seen, in this example implementation, venue 104 may be defined, for example, by an interior of a venue or a portion thereof, which may have one or more entryways, hallways, cubicles, walls, dividers, staircases, doors, rooms, elevators, or the like.

Access points 102a, 102b, and 102c may not only transmit wireless signals but may also receive wireless signals. As indicated generally by dashed lines 106, access points may be operatively coupled to a network 108 that may, for example, be representative of one or more wired or wireless communications or computing networks capable of providing suitable or desired information related to operating environment 100, such as assistance data including heat map information, identities of access points, map or venue information, or the like. Map or venue information may comprise, for example, electronic digital map information (e.g., floor plans, etc.) associated with an indoor or like environment or a portion of such environment in connection with a venue or area of interest. Here, by way of non-limiting example, map information may comprise all or part of one or more computer-aided design (CAD) information exchange files relating to venue 104, for example. As a way of illustration, map or venue information may identify one or more structural features of venue 104, for example, such as walls, rooms, doors, passageways, elevators, staircases, ladders, floors, ceilings, or the like. Of course, claimed subject matter is not limited in these respects.

In certain example implementations, network 108 may include, for example, the Internet or other like computing or communication resources capable of providing suitable or desired information to one or more mobile devices via one or more 802.11 WLAN links, such as a link 110, and/or through access points 102. Such information may include, for example, assistance data in the form of heat map information, etc., as previously mentioned. Alternatively, network 108 may provide suitable or desired information to one or more mobile devices via cellular data links (not shown).

As illustrated generally by a number of lightning bolt-shaped symbols, mobile devices 112a, 112b, and 112c may communicate with network 108 through access points 102 or cellular data links (not shown). Again, even though only a certain number of mobile devices are illustrated, it should be appreciated that any number of mobile devices may be implemented to facilitate or otherwise support one or more techniques or processes associated with operating environment 100. As was indicated, wireless signals may be provided for use by at least one mobile device 112, for example, to facilitate or support navigation or location services based on heat map signature matching techniques. Also, wireless signals may be provided to at least one mobile device 112 for one or more other purposes. For example, one or more mobile devices 112 may be enabled for information pulling or pushing communication techniques or other like information communication processes to obtain venue or map information, access point information, etc., as previously mentioned.

As was indicated, in certain implementations, assistance information may be provided to at least one mobile device 112 to facilitate or support heat map-based positioning. Here, assistance data may comprise, for example, suitable or desired heat map information generated for venue 104 using one or more simulations facilitated or supported by operating environment 100. As described below, such heat map information may comprise one or more heat map values associated with a particular grid point. Generated heat map information may be subsequently stored on a suitable server 114 associated with network 108, or the like, and forwarded to at least one mobile device 112 to allow for a sufficiently accurate position fix (e.g., via heat map signature matching, etc.), as mentioned above. Of course, such details are merely examples, and claimed subject matter is not so limited.

Operating environment 100 may include a heat map comprising a grid of points, which may be associated with a local or global coordinate system and laid over or mapped to a floor plan of venue 104 at substantially uniform spacing (e.g., two-foot separation of adjacent grid points). Accordingly, for each access point 102, a heat map may associate a grid point with heat map information including, for example, mean RSSI, standard deviation of RSSI, mean RTT, standard deviation of RTT, or like values, just to name a few examples, for signals transmitted between access point 102 and the associated grid point. Of course, such details relating to heat maps are merely examples, and claimed subject matter is not limited in this regard. Such types of heat maps are well known in the art.

For a large indoor venue 104 with a large number of access points 102 and small heat map grid point spacing, the complete database for the whole venue 104 may become very large. Therefore it can become cost-prohibitive for mobile users with limited data plans to download an assistance data file comprising the complete database. In addition, a mobile device 112 may not have sufficient resources (e.g., memory, processing capacity, etc.) available to handle an assistance data file comprising the complete database. Tiling or subdividing a venue 104 does not completely solve the problem because the resulting assistance data files may still be too large. Thus further reducing the assistance data file size by providing tiered service with adaptive assistance data in an indoor positioning system is desirable.

Figure 2:
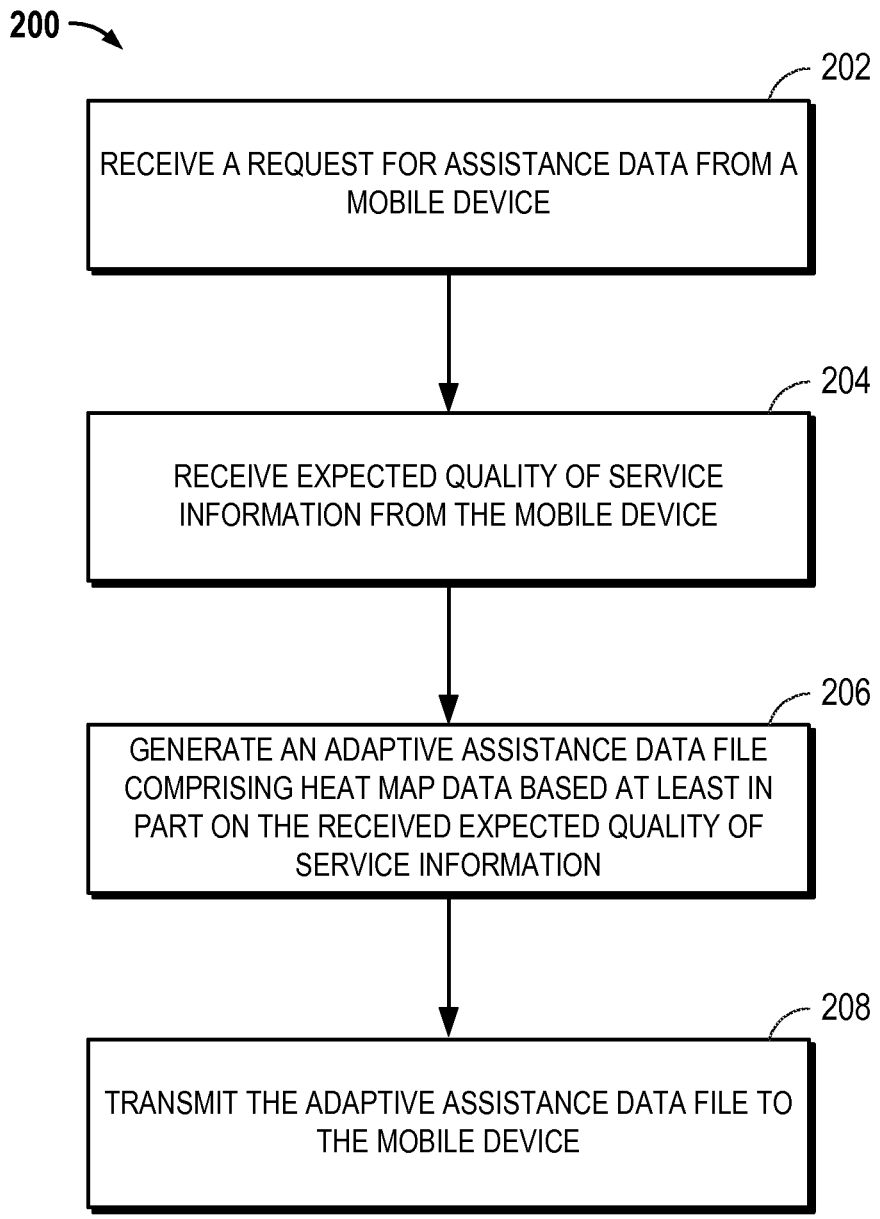
FIG. 2 is a flow diagram illustrating an implementation of an example process for performing one or more processes or operations in connection with providing tiered positioning service with adaptive assistance data in an indoor venue.

FIG. 2 is a flow diagram illustrating an implementation of an example process 200 for performing one or more processes or operations in connection with providing tiered positioning service with adaptive assistance data in an indoor venue 104. It should be appreciated that even though one or more operations are illustrated or described with respect to a certain sequence, other sequences including, for example, concurrent operations may also be employed. In addition, although the description below references particular aspects or features illustrated in certain other figures (e.g., FIG. 3, etc.), one or more operations may be performed with other aspects or features.

Example process 200 may begin at operation 202, in which a server apparatus 114 receives from a mobile device 112 a request for assistance data. At the next operation 204, the server apparatus 114 receives expected quality of service information from the same mobile device 112. The expected quality of service may be represented in the form of, for example, a positioning accuracy level of X feet, or a size limit on the assistance data file of Y megabytes, or a combination of both. If the server apparatus 114 determines an expected quality of service in the form of a combination of a positioning accuracy level and a size limit on the assistance data file is impossible to meet, it may transmit a message to the mobile device 112 indicating the impossibility, and the mobile device 112 may relax at least one of the requirements and transmit a new expected quality of service to the server apparatus 114. The expected quality of service may be determined by a variety of factors, such as, the objective of the application running on the mobile device 112. For example, a navigation application may require a more accurate position fix than a coupon or an advertisement application. Also, there may be the hardware resource limitations of the mobile device 112. For example, the mobile device 112 may need to limit the size of the assistance data file because it has insufficient memory and/or processing capacity. Also, the user of the mobile device 112 may specify particular requirements. For example, the user may elect for a small assistance data file to conserve data usage.

Example process 200 continues to the next operation 206. At operation 206, an adaptive assistance data file including heat map data may be generated by the server apparatus 114 based at least in part on the expected quality of service received at operation 204. Operation 206 will be described in further detail with reference to FIG. 4. At the next operation 208, the assistance data file is transmitted from the server apparatus 114 via network 108 to the mobile device 112 that has requested assistance data at operation 202 and 204, where heat map signature matching techniques are performed to obtain a location fix. Although heat map signature matching techniques are used herein as an example, claimed subject matter is not so limited. It should be appreciated that other positioning techniques including, but not limited to, sequential filtering methods such as Particle filters, extended Kalman filters, and unscented Kalman filters, etc., can also be utilized.

Figure 3:
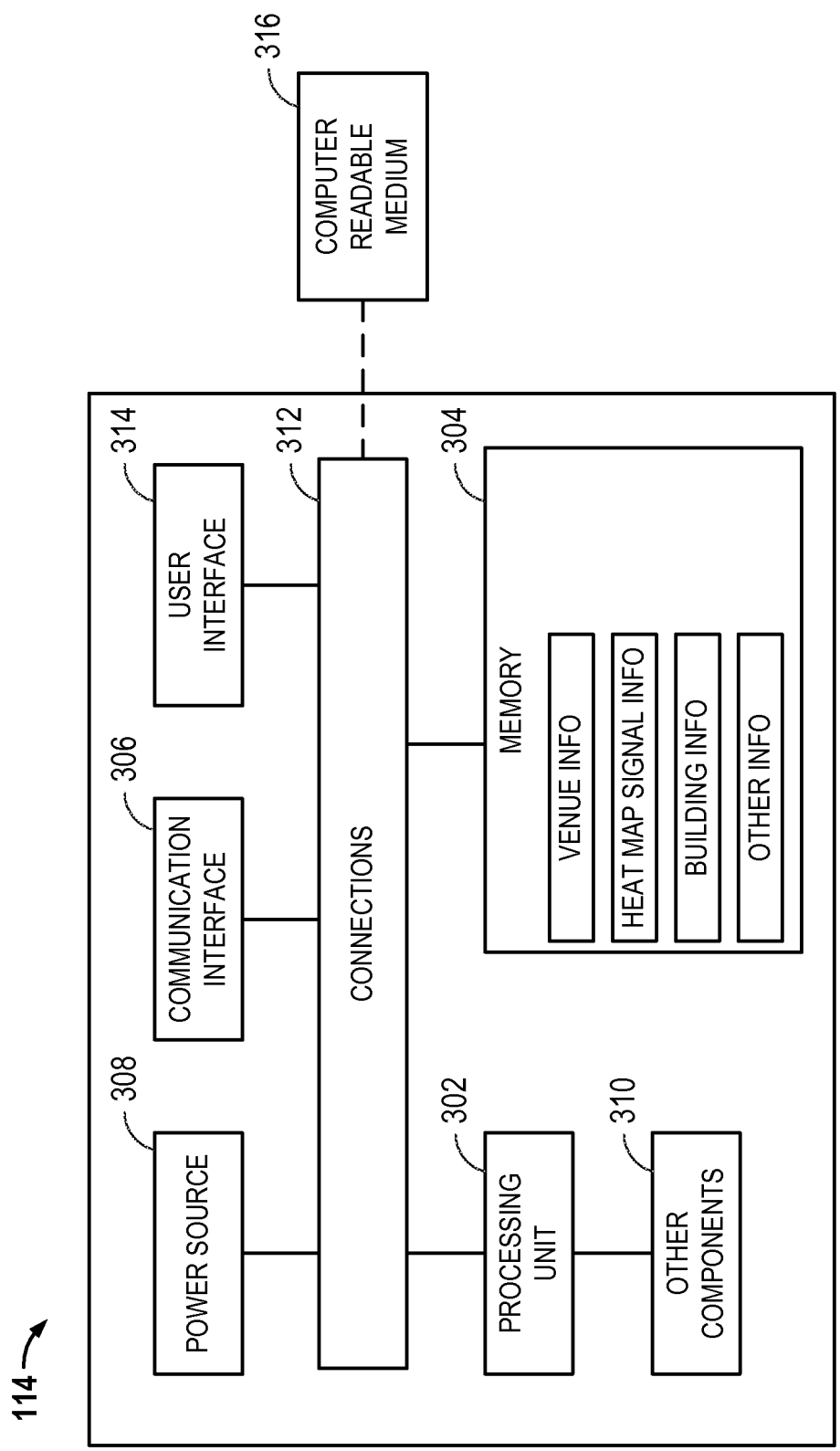
FIG. 3 is a schematic diagram illustrating an implementation of an example device capable of implementing a process in connection with providing tiered positioning service based on adaptive assistance data in an indoor venue.

FIG. 3 is a schematic diagram illustrating an implementation of an example server apparatus 114 capable of partially or substantially implementing one or more processes or operations in connection with providing tiered positioning service based on adaptive assistance data in an indoor venue 104. In an implementation, server apparatus 114 may comprise, for example, any electronic device having at least one processor and memory that may be configurable to exchange data or information over any suitable communications network. For example, server apparatus 114 may include one or more computing devices or platforms associated with, for example, a laptop computer, a desktop computer, a tablet PC, a cellular telephone, access points, transceiver chips, an e-book reader, a workstation, a server device, data storage units, or the like. In other example implementations, server apparatus 114 may take the form of one or more integrated circuits, circuit boards, or the like that may be operatively enabled for use in another device. It should be appreciated that all or part of various components shown in connection with example server apparatus 114, and the processes or operations as described herein, may be implemented using or otherwise include hardware, firmware, or any combination thereof along with software. It should also be noted that example server apparatus 114 may include more, fewer, or different components from those that are illustrated.

As illustrated, example server apparatus 114 may include at least one processing unit 302, memory 304, communication interface 306, power source 308, and one or more other components, indicated generally at 310, for example, so as to facilitate or support one or more processes or operations in connection with providing tiered positioning service based on adaptive assistance data in an indoor venue 104. Processing unit 302 may be implemented in hardware or a combination of hardware and software. Processing unit 302 may be representative of one or more circuits configurable to perform at least a portion of information computing technique or process. By way of example but not limitation, processing unit 302 may include one or more processors, controllers, microprocessors, microcontrollers, application specific integrated circuits, digital signal processors, programmable logic devices, field programmable gate arrays, and the like, or any combination thereof.

Memory 304 may store, contain, or otherwise provide access to computer-readable instructions (e.g., a program, an application, etc. or portion(s) thereof; operational data or information structures; processor-executable instructions; code; some combination thereof; and so forth) that may be executable by processing unit 302. Execution of such instructions by processing unit 302 may transform example server apparatus 114 into a special purpose computing device, apparatus, platform, some combination thereof, and so forth. Memory 304 may represent any information storage medium. As seen, memory 304 may comprise venue information, heat map signature information, or other suitable or desired information facilitating or supporting one or more processes or operations in connection with providing tiered positioning service based on adaptive assistance data in an indoor venue 104. While illustrated in this example as being separate from processing unit 302, it should be appreciated that all or part of memory 304 may be provided within or otherwise co-located/coupled with processing unit 302.

As an example, computer-readable medium 316 and/or memory 304 may be accessed by processing unit 302, for example. As such, in certain example implementations, the methods or apparatuses may take the form, in whole or in part, of a computer-readable medium that may include computer-implementable instructions stored thereon, which, if executed by at least one processing unit or other like circuitry, may enable processing unit 302 or the other like circuitry to perform all or portions of location determination processes, heat map signature-based processes, or any processes to facilitate or otherwise support providing tiered positioning service based on adaptive assistance data in an indoor venue 104. In certain example implementations, processing unit 302 may be capable of performing or supporting other functions, for example, associated with operating environment 100 of FIG. 1, such as communication, routing, etc.

Example server apparatus 114 may further include a communication interface 306 (e.g., wireless transceiver, modem, antenna, etc.) to allow for communication with one or more other devices or systems over one or more wired or wireless communication links. Communication interface 306 may provide one or more interfaces between server apparatus 114 and other devices. Communication interface 306 may be capable of requesting, receiving, or providing suitable or desired location, navigation, assistance, or like information. Assistance information may include any suitable information facilitating or supporting position estimations utilizing, for example, a heat map positioning-based operations or techniques, as previously mentioned. In addition, in certain implementations, assistance information may include, for example, routing graph information, venue information, connectivity graph information, location information, as well as associated annotation information, or the like. As was indicated communication interface 306 may include a wireless transceiver (e.g., transmitter and receiver), a radio, an antenna, a wired interface connector or other such apparatus, some combination thereof, etc. to communicate wireless or wired signals over respective wireless or wired communication links.

Example server apparatus 114 may also include a power source 308 to provide power to some or all of the components or circuitry of example server apparatus 114. Power source 308 may be a portable power source, such as a battery, for example, or may comprise a fixed power source, such as an outlet (e.g. in a house, electric charging station, car, etc.). It should be appreciated that power source 308 may be integrated into (e.g., built-in, etc.) or otherwise supported by (e.g., stand-alone, etc.) example server apparatus 114. Power source 308 may also be a transportable power source, such as a solar or carbon-fuel-based generator. Although not shown, it should be noted that components or circuitry of example server apparatus 114 may include an analog-to-digital converter (ADC) for digitizing output signals, although claimed subject matter is not so limited.

Example server apparatus 114 may also include one or more connections 312 (e.g., buses, lines, conductors, optic fibers, etc.) to operatively couple various circuits or components, such as one or more other components 310, for example, together, and, optionally or alternatively, a user interface 314 (e.g., display, touch screen, keypad, buttons, knobs, microphone, speaker, trackball, data port, etc.) to receive requisite input or provide suitable information to a user. Other components 310, if present, may comprise one or more other miscellaneous sensors, features, or the like.

Figure 4:
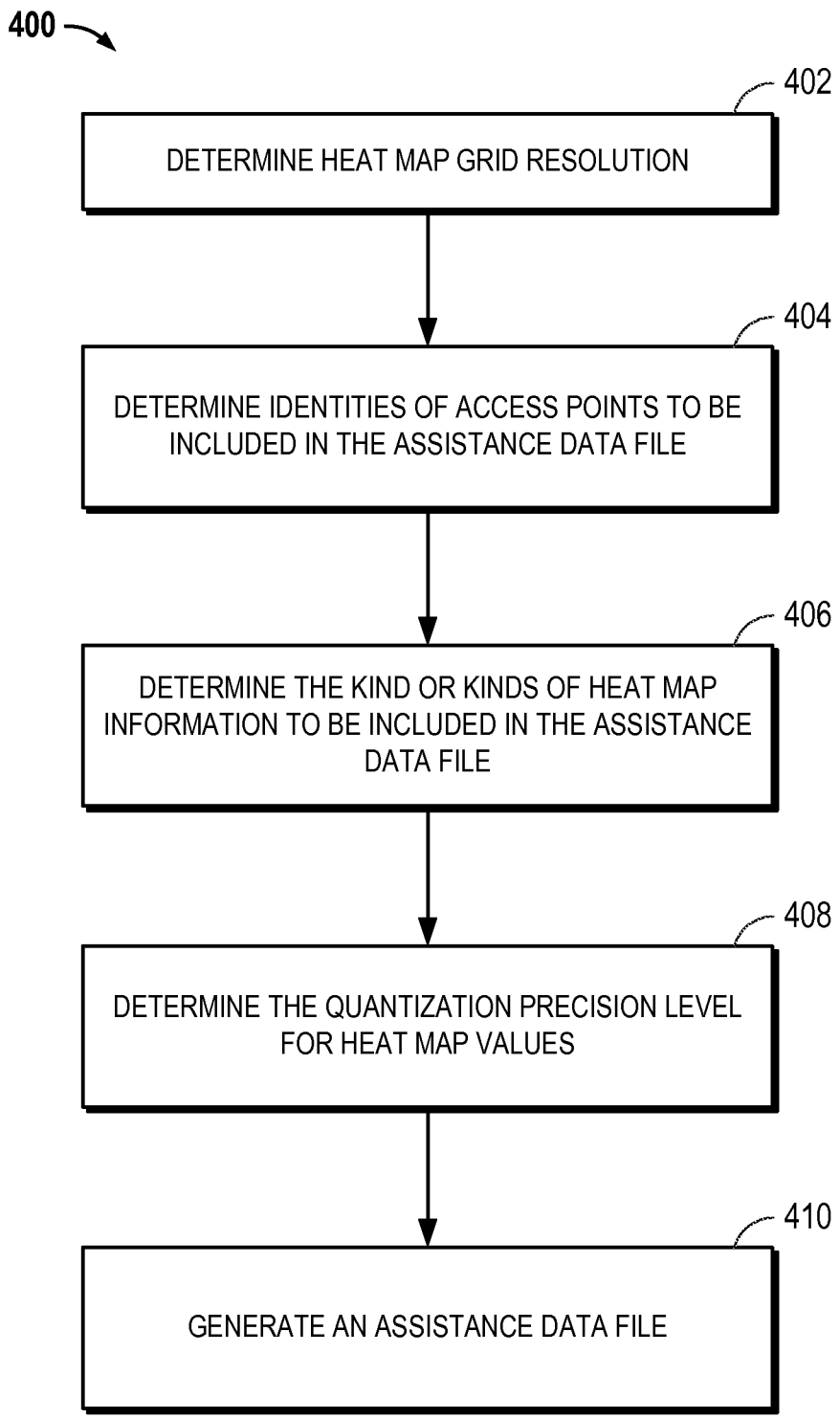
FIG. 4 is a flow diagram further illustrating additional operations.

Turning now to FIG. 4, which is a flow diagram further illustrating operations of FIG. 2. It should be appreciated that even though one or more operations are illustrated or described with respect to a certain sequence, other sequences including, for example, concurrent operations may also be employed. The objective of example process 400 is to generate the smallest possible assistance data file that meets the accuracy expectation, when the expected quality of service is represented in a positioning accuracy level, or to generate an assistance data file that enables the most accurate position fix within the size limit, when the expected quality of service is represented in a size limit on the assistance data file. Example process 400 generates assistance data files of different sizes and/or accuracy levels by varying one or more aspects of the heat map, as described below. How to generate an assistance data file within the confines of a given expected quality of service by varying one or more aspects of the heat map is well known in the art.

At operation 402, the resolution of the heat map grid (i.e., spacing between adjacent grid points) may be determined by the server apparatus 114. The higher the resolution of the heat map grid is, the smaller the spacing between adjacent grid points is, the larger the assistance data file is, and the higher the positioning accuracy level the assistance data file can enable is, and vice versa. As an example, the resolution of the heat map grid may be varied in two ways. In one embodiment, two or more versions of the heat map with different resolutions are generated by the server apparatus 114 and stored in a database in memory. The version that better suits the current expected quality of service is selected at operation 402. In an alternative embodiment, only one heat map with sufficiently high resolution that can meet the highest possible expected quality of service is generated and stored in the database. When a lower expected quality of service is requested, an ad-hoc heat map with a lower resolution is generated on-the-fly by the server apparatus 114 at operation 402 by removing one or more grid points from the high-resolution heat map stored in the database.

It is also possible for the server apparatus 114 to take into account structural features of the sub-area where the mobile device 112 requesting assistance data is located when determining grid point resolution at operation 402. For example, if the mobile device 112 is on an office floor with many cubicles or offices separated by narrow walkways, a high-resolution heat map with a 1-to-2-feet grid point spacing may be used; when the mobile device 112 is in a large open area lacking features, such as, for example, a conference room or an atrium, a low-resolution heat map with a 4-to-6-feet grid point spacing may be used. By way of example but not limitation, the complexity of structural features of sub-areas can be categorized, coded, and inputted into the database by a human being. Alternatively, a computer program may be utilized with the server apparatus 114 to automatically analyze a floor map and determine and categorize the complexity of structural features of sub-areas. It should be appreciated that varying the grid resolution in the way described above in this paragraph can reduce the assistance data file size without a compromise on utility.

At the next operation 404, identities of access points 102 to be included in the assistance data file are determined by the server apparatus 114. It should be appreciated that when there is a large enough number of access points 102 present, a position fix is possible without using information relating to all detectable access points 102. But the more the access points 102 whose information is included there are, the higher the positioning accuracy level is, and the larger the assistance data file is, and vice versa. Therefore it should be appreciated that varying the positioning accuracy level and/or the size of an assistance data file can be achieved by including or excluding the use of information relating to one or more access points 102. For example, in one embodiment, when a high positioning accuracy level is requested, information relating to most, if not all, access points 102 is included by the server apparatus 114 in the assistance data file. On the other hand, when a low positioning accuracy level is sufficient, or when the assistance data file size is a major concern, information relating to only a smaller subset of access points 102 is included in the assistance data file by the server apparatus 114.

It should be appreciated that a number of methods can be utilized to optimize the selection of access points 102 to be included in the assistance data file when only a subset of access points 102 is to be included. For example, in one method, a subset of access points 102 is selected such that the area encompassed by a convex hull of those selected access points 102 is maximized. This is equivalent to selecting access points 102 that are closer to the periphery of the venue 104. In another method, the selected subset of access points 102 includes those access points 102 that are known to have smaller measurement noise in RSSI and RTT measurements. In yet another method, the selected subset of access points 102 includes those access points 102 that have more uniform transmit powers over time. In yet another method, the selected subset of access points 102 includes those access points 102 that are operational at the time of assistance data file generation. It should be appreciated that an access point controller module can be implemented as a software routine with the server apparatus 114 that enables the server apparatus 114 to communicate with access points 102 via network 108 to collect real-time status information about access points 102. Alternatively, the access point controller module may be implemented in either software or hardware form separate from the server apparatus 104 and coupled with network 108, wherein the access point controller module collects real-time status information about access points 102 and provides the same information to the server apparatus 114 on request via network 108.

It is also possible for the server apparatus 114 to take into account the specific time of the assistance data file request when determining information relating to which access points 102 are to be included in the assistance data file at operation 404. Because some access points 102 are located inside businesses, they may become inaccessible from the outside when the businesses are closed after business hours. In an instance like this, it is desirable to exclude information relating to inaccessible access points 102 from assistance data to improve positioning accuracy and reduce the assistance data file size. In one embodiment, if an access point 102 is inaccessible during a certain time of the day or certain days of the week, this information is recorded in the database. When an assistance data request is received inside such a time period, information relating to the temporarily inaccessible access point 102 is excluded by the server apparatus 114 from the assistance data file.

At the next operation 406, the kind or kinds of heat map information to be included in the assistance data file is determined by the server apparatus 114. As described above, a number of different kinds of heat map information can be used in heat map signature matching techniques. Heat map information may include, for example, mean RSSI, standard deviation of RSSI, mean RTT, standard deviation of RTT, or like values. The more the kinds of heat map information used there are, the higher the positioning accuracy level is, and the larger the assistance data file size is, and vice versa. Therefore, for example, in one embodiment, when a high positioning accuracy level is requested, both RSSI information (e.g., mean RSSI and standard deviation of RSSI) and RTT information (e.g., mean RTT and standard deviation of RTT) are included in the assistance data file by the server apparatus 114; when a low positioning accuracy level is sufficient, or when the assistance data file size is a major concern, only one of RSSI information and RTT information, but not both, is included in the assistance data file by the server apparatus 114.

At the next operation 408, the quantization precision level for heat map values is determined. As described above, heat map values may include, for example, mean RSSI, standard deviation of RSSI, mean RTT, standard deviation of RTT, or like values. These values are quantized for the first time when the heat map is generated and stored in the database. These quantized values can be further quantized to a lower precision level by truncating or rounding one or more least significant bits during assistance data file generation by the server apparatus 114 to reduce the assistance data file size. The higher the quantization precision level is, the more the bits used to represent a heat map value there are, the higher the positioning accuracy level is, and the larger the assistance data file size is, and vice versa. Therefore, for example, in one embodiment, positive integers l, m, n are known and satisfy the following relationship: $l \geq m > n$, and heat map values are quantized to l bits when being stored in the database. When a high positioning accuracy level is requested, heat map values are quantized to m bits by the server apparatus 114 in the assistance data file; when a low positioning accuracy level is sufficient, or when the assistance data file size is a major concern, heat map values are quantized by the server apparatus 114 to n bits in the assistance data file.

At the next operation 410, an assistance data file is generated by the server apparatus 114 based on determinations made in operations 402 through 408.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

Wireless communication techniques described herein may be implemented using various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), or the like.

Also, computer instructions/code/data may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, data, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method for providing tiered indoor positioning service, comprising:
   receiving a request for assistance data from a mobile device;
   receiving expected quality of service information from the mobile device;
   generating an adaptive assistance data file comprising heat map information, wherein the heat map information includes a heat map grid resolution and a suitable quantization precision level for heat map values based, at least in part, on the expected quality of service information; and
   transmitting the adaptive assistance data file to the mobile device.

2. The method of claim 1, wherein the heat map grid resolution is determined at least in part by structural features of sub-areas within an indoor venue.

3. The method of claim 1, wherein generating the adaptive assistance data file further comprises including or excluding the use of information relating to one or more access points.

4. The method of claim 3, wherein the use of information relating to one or more access points is determined at least in part by a particular time.

5. The method of claim 1, wherein generating the adaptive assistance data file further comprises selecting between using information relating to only a Received Signal Strength Indicator, using information relating to only a Round-Trip Time, or using information relating to both the Received Signal Strength Indicator and the Round-Trip Time.

6. The method of claim 1, wherein the expected quality of service information is determined at least in part by an objective of a mobile application.

7. The method of claim 1, wherein the expected quality of service information is determined at least in part by a memory capacity or processing capacity of the mobile device.

8. The method of claim 1, wherein the expected quality of service information includes a requested positioning accuracy level.

9. The method of claim 1, wherein the expected quality of service information includes an upper size limit for the adaptive assistance data file.

10. A server apparatus for providing tiered indoor positioning service, comprising:
    a communication interface configured to:
       receive a request for assistance data from a mobile device
       receive expected quality of service information from the mobile device; and
       transmit an adaptive assistance data file to the mobile device;
    a memory; and
    a processor, coupled to the memory, configured to:
       generate the adaptive assistance data file comprising heat map information, wherein the heat map information includes a heat map grid resolution and a suitable quantization precision level for heat map values based, at least in part, on the expected quality of service information.

11. The server apparatus of claim 10, wherein the heat map grid resolution is determined at least in part by structural features of sub-areas within an indoor venue.

12. The server apparatus of claim 10, wherein the processor configured to generate the adaptive assistance data file is further configured to include or exclude the use of information relating to one or more access points.

13. The server apparatus of claim 12, wherein the use of information relating to one or more access points is determined at least in part by a particular time.

14. The server apparatus of claim 10, wherein the processor configured to generate the adaptive assistance data file is further configured to select between using information relating to only a Received Signal Strength Indicator, using information relating to only a Round-Trip Time, or using information relating to both the Received Signal Strength Indicator and the Round-Trip Time.

15. The server apparatus of claim 10, wherein the expected quality of service information is determined at least in part by an objective of a mobile application.

16. The server apparatus of claim 10, wherein the expected quality of service information is determined at least in part by a memory capacity or processing capacity of the mobile device.

17. The server apparatus of claim 10, wherein the expected quality of service information includes a requested positioning accuracy level.

18. The server apparatus of claim 10, wherein the expected quality of service information includes an upper size limit for the adaptive assistance data file.

19. A non-transitory computer-readable medium including code that, when executed by a processor, causes the processor to:
    receive a request for assistance data from a mobile device;
    receive expected quality of service information from the mobile device;
    generate an adaptive assistance data file comprising heat map information, wherein the heat map information includes a heat map grid resolution and a suitable quantization precision level for heat map values based, at least in part, on the expected quality of service information; and
    transmit the adaptive assistance data file to the mobile device.

20. The computer-readable medium of claim 19, wherein the heat map grid resolution is determined at least in part by structural features of sub-areas within an indoor venue.

21. The computer-readable medium of claim 19, wherein the code to generate the adaptive assistance data file further comprises code to include or exclude the use of information relating to one or more access points.

22. The computer-readable medium of claim 21, wherein the use of information relating to one or more access points is determined at least in part by a particular time.

23. The computer-readable medium of claim 19, wherein the code to generate the adaptive assistance data file further comprises code to select between using information relating to only a Received Signal Strength Indicator, using information relating to only a Round-Trip Time, or using information relating to both the Received Signal Strength Indicator and the Round-Trip Time.

24. The computer-readable medium of claim 19, wherein the expected quality of service information is determined at least in part by an objective of a mobile application.

25. The computer-readable medium of claim 19, wherein the expected quality of service information is determined at least in part by a memory capacity or processing capacity of the mobile device.

26. The computer-readable medium of claim 19, wherein the expected quality of service information includes a requested positioning accuracy level.

27. The computer-readable medium of claim 19, wherein the expected quality of service information includes an upper size limit for the adaptive assistance data file.

28. An apparatus for providing tiered indoor positioning service, comprising:
    means for receiving a request for assistance data from a mobile device;
    means for receiving expected quality of service information from the mobile device;
    means for generating an adaptive assistance data file comprising heat map information, wherein the heat map information includes a heat map grid resolution and a suitable quantization precision level for heat map values based, at least in part, on the expected quality of service information; and
    means for transmitting the adaptive assistance data file to the mobile device.

29. The apparatus of claim 28, wherein the heat map grid resolution is determined at least in part by structural features of sub-areas within an indoor venue.

30. The apparatus of claim 28, wherein the means for generating the adaptive assistance data file further comprises means for including or excluding the use of information relating to one or more access points.

31. The apparatus of claim 30, wherein the use of information relating to one or more access points is determined at least in part by a particular time.

32. The apparatus of claim 28, wherein the means for generating the adaptive assistance data file further comprises means for selecting between using information relating to only a Received Signal Strength Indicator, using information relating to only a Round-Trip Time, or using information relating to both the Received Signal Strength Indicator and the Round-Trip Time.

33. The apparatus of claim 28, wherein the expected quality of service information is determined at least in part by an objective of a mobile application.

34. The apparatus of claim 28, wherein the expected quality of service information is determined at least in part by a memory capacity or processing capacity of the mobile device.

35. The apparatus of claim 28, wherein the expected quality of service information includes a requested positioning accuracy level.

36. The apparatus of claim 28, wherein the expected quality of service information includes an upper size limit for the adaptive assistance data file.

* * * * *